US008154711B1

(12) United States Patent
Scheer

(10) Patent No.: US 8,154,711 B1
(45) Date of Patent: Apr. 10, 2012

(54) SPRAY DIAGNOSTIC AND CONTROL METHOD AND SYSTEM

(76) Inventor: Ingo Werner Scheer, La Jolla, CA (US)

( * ) Notice: Subject to any disclaimer, the term of this patent is extended or adjusted under 35 U.S.C. 154(b) by 861 days.

(21) Appl. No.: 12/075,630

(22) Filed: Mar. 12, 2008

Related U.S. Application Data

(63) Continuation-in-part of application No. 11/243,142, filed on Oct. 3, 2005, now Pat. No. 7,792,611.

(60) Provisional application No. 60/615,169, filed on Oct. 1, 2004.

(51) Int. Cl.
*G01C 3/08* (2006.01)

(52) U.S. Cl. ...... 356/3.07; 356/3.01; 356/3.1; 356/3.15; 356/4.01

(58) Field of Classification Search ........ 356/3.01–3.15, 356/4.01–4.1, 5.01–5.15, 6–22
See application file for complete search history.

(56) References Cited

U.S. PATENT DOCUMENTS 6,457,655 B1 10/2002 Reighard et al.
6,734,965 B2 * 5/2004 Talley et al. .................. 356/318
2004/0131243 A1 * 7/2004 Farina ........................... 382/141
2005/0066903 A1 * 3/2005 Van Den Berg et al. ... 119/14.08
2007/0236693 A1 10/2007 Prociw et al.
2007/0242871 A1 10/2007 Prociw et al.

FOREIGN PATENT DOCUMENTS

WO WO 01/13092 A1 2/2001
WO WO 01/13322 A1 2/2001

OTHER PUBLICATIONS

Chen S, "Factors influencing the circumferential liquid distribution from pressure-swirl atomizers", Journal of Engineerin for Gas Turbines an Power, 115:447-452, Jul. 1, 1993.
Tate, R. W., "Spray Patternation," Industrial and Engineering. Chemistry, vol. 52, Oct. 1960, p. 49A.
Wang, G et al., An Optical Spray Pattern Analyzer, extended abstracts from the 10.sup.th Annual Conference on Liquid Atomization and Spray Systems, ILASS-Americas 97, May 18-2.

* cited by examiner

*Primary Examiner* — Thomas Tarcza
*Assistant Examiner* — Luke Ratcliffe

(57) ABSTRACT

The purpose of the invention is to ensure high-quality coatings of medical implants using a new data evaluation and process control approach. Information on spray errors, such as areas with high and low droplet distribution, can be easily and reproducibly obtained by analyzing the axial and/or longitudinal cross-section of the spray using the apparatus and method of the present invention.

26 Claims, 8 Drawing Sheets

SPRAY DIAGNOSTIC AND CONTROL METHOD AND SYSTEM

CROSS-REFERENCE TO RELATED APPLICATIONS

This application is a continuation in part of commonly owned U.S. Application Ser. No. 60/615,169 filed on Oct. 1, 2004 and U.S. application Ser. No. 11/243,142 filed on Oct. 3, 2005 now U.S. Pat. No. 7,792,611 which is incorporated herein by reference.

FEDERALLY SPONSORED RESEARCH

Not Applicable

SEQUENCE LISTING OR PROGRAM

Not Applicable

BACKGROUND OF THE INVENTION

Field of Invention

The present invention relates to the field of spatial droplet distribution analysis and spray process control and more particularly, to provide objective quality criteria for atomizer assessment and for controlling medical device coating processes.

Sprays are critical for the performance of various industrial processes like paint spraying, powder production, aerosol generation for inhalation therapy, fuel injection as well as tablet and implant coating. The fact that medical implants such as drug coated wire mesh stents, tablets or other drug delivery devices are used in life-threatening situations places stringent demands on the coating manufacturing process. Since a major factor controlling the rate of drug release of the coating is the coating thickness, it is necessary to ensure that the coating is uniform in thickness from one device to the next and free of coating defects.

A particular problem exists for thin-film coating of medical devices, where small variations in spray performance will have a negative impact on the success of the drug delivery application and can considerably affect device performance. When coating medical devices using a spraying device, coating defects and coating weight deviations may occur due to poor nozzle performance and/or insufficient process control. Deterioration of the spray characteristics may be caused, among others, by nozzle damage, improper assembly of the nozzle, changing operating parameters, gas currents in the coating zone, gas bubbles in the fluid line, nozzle build-up, and clogging.

In the prior art the spatial droplet or particle distribution is not sufficiently quantitatively evaluated and repeatable information on the spray pattern is not provided, resulting in poor spray quality comparability and insufficient nozzle quality control due to the lack of objective quality criteria. In addition, current spray coating systems and methods rely mainly on monitoring nozzle operating parameters and do not evaluate the spray performance in relation to the substrate to be coated. Known systems and measurement techniques provide rather subjective information on the quality of the spraying device and do not allow reproducible calibration and feedback control of the coating processes. Poor quality and reproducibility within a series of spraying devices as well as insufficient calibration and control of the spray coating process will have a negative impact on the particular drug delivery application.

Therefore, there is a need for a new method and system which allows in-depth spray characterization and improved control of medical device coating processes that overcome the drawbacks of methods and systems known by the prior art.

Objects

The invention is directed to enhance the coating quality of substrates by controlling and evaluating key parameters of precision coating processes, namely quality of the spraying device, spray source position in relation to a specific spray target, as well as spray characteristics and nozzle operating parameters prior and during the spraying process.

It is one object to provide a method and system for analysis of the axial and longitudinal cross-section of a spray pattern that provides repeatable results and objective quality control criteria.

It is a further object to disclose a method and system to reproducibly calibrate the spray in relation to a spray target.

It is another object to provide a versatile measurement apparatus for reproducibly measuring the spatial droplet distribution within the axial and longitudinal cross-section of a spray at various measurement points.

It is an additional object to provide a method to obtain quantitative objective information in real-time on the spray process and predictive coating weight of a substrate to be coated.

It is yet another object to provide feedback control of spray characteristics and nozzle operating parameters to ensure that the spraying process is within specifications.

SUMMARY

The purpose of the invention is to ensure high-quality coatings of medical implants using a new data evaluation and process control approach. Information on spray errors, such as areas with high and low droplet distribution, can be easily and reproducibly obtained by analyzing the axial and/or longitudinal cross-section of the spray using the apparatus and method of the present invention. An important feature of the method and system is the ability to generate objective and reproducible information on the spray characteristics by comparing the pattern to be evaluated with a reference pattern having a symmetrical distribution. The reference pattern or desired spray pattern may be mathematically described and easily customized for specific spraying requirements.

This allows spray nozzle validation for a specific application as well as calibration and control of a particular spraying process. A procedure is provided to obtain quantitative information on the quality of the resulting coating and on the final coating weight of the substrate during a spray coating process.

In one embodiment, a method to objectively assess the quality of a spray pattern comprises the step of: (a) determining a pattern having a symmetrical distribution representing the desired spray distribution that is used as reference pattern, (b) obtaining a spray pattern, (c) comparing the spray pattern with the reference pattern to detect deviations between both patterns, and (d) evaluating the deviations in terms of size and/or location, wherein steps (b), (c) and (d) may be performed continuously during a spraying process to assess the current process performance and for a series of spraying devices to assess the spray quality within a batch. In addition, a tolerance range for at least one parameter to be evaluated may be defined. Also, the step of monitoring the scattered light intensity signal of the spray over time to measure the consistency of the spraying process and to calculate the coefficient of variation of the scattered light intensity signal values for a time interval may be conducted. In one or more embodiments, the spray pattern is obtained using a detection apparatus including at least a light source, a processing unit, and a detector having a detection area to capture the spray pattern. The spray pattern may captured through at least two detectors, wherein the first detector captures a Mie scattering signal and the second detector a laser-induced fluorescence signal and both signals are processed to obtain information on the droplet sizes produced by the spraying device may be performed. The reference pattern may be determined by performing a function fit by the following steps: determining a suitable fit function with at least two independent variables, adjusting at least one coefficient of the fit function, evaluating the fit function, determining the differences between the spray pattern with the desired spray characteristics and the calculated pattern, and choosing the coefficient that provides the best fit between the spray pattern with the desired spray characteristics and the calculated pattern.

When the method is performed during a coating process of a substrate, a tolerance range may be defined for the deviations between the spray pattern and the reference pattern and the substrate may be exposed to the spray stream when the deviations are in tolerance. In addition, the liquid flow rate of the fluid to be disintegrated may be monitored by defining a tolerance range for the flow rate, measuring the flow rate, and exposing the substrate to the spray when the flow rate is in tolerance. Furthermore, the following steps may be conducted: obtaining the position of the substrate within the detection area, transforming the reference pattern and/or the substrate in close proximity to each other, acquiring the spray pattern, comparing the spray pattern with the reference pattern to detect deviations between both patterns, and determining the size and/or the location of the deviations in relation to the substrate. The position of the substrate can be determined by projecting the substrate position into the detection area or by locating the detection area and/or the spray target in close proximity to each other.

Steps (c), (d) and (e) may be repeated to control the coating process. In addition, the step of adjusting at least one parameter, such as the position and/or an operating setting of the spraying device, may be conducted to minimize the deviations between the acquired spray pattern and the reference pattern.

In another embodiment, a method is presented to predict the amount of material deposited on a substrate during a coating process using a spray pattern detection apparatus including at least a light source, a processing unit, and a detector having a detection area to capture a spray. The method comprises the steps of (a) obtaining the position of the substrate within the detection area of the detector, (b) detecting a spray pattern, (c) quantifying the spray pattern intensity for the part covering the substrate, and (d) totalizing the spray pattern intensity values during the time the substrate is exposed to the spray to obtain the coating weight of the coated substrate. In one or more embodiments, the substrate may be a medical device. In addition, a calibration step may be conducted, including measuring the weight of the deposited material on the substrate and determining a relation between the totalized spray pattern intensity values obtained during material deposition and the weight of deposited material.

In still another embodiment, a method is provided to enhance coverage of a substrate with a fluid to be disintegrated by a spraying device using a spray pattern detection apparatus including at least a light source, a processing unit, and a detector to capture a spray. The method, comprises the following steps: (a) obtaining the position of the substrate within the detection area, (b) acquiring a spray pattern, (c) calculating the center of gravity of the spray pattern, (d) determining the distance between the center of gravity of the spray pattern and the position of the substrate, and (e) adjusting at least one parameter to minimize the distance between the center of gravity of the spray pattern and substrate position, wherein steps (b), (c), (d) and (e) are repeated during the coating process.

In yet another embodiment, an apparatus is presented for characterizing a spray generated by a spraying device comprising at least a laser for producing a light sheet, a detector and a spraying device. At least a part of the apparatus can be rotated around the longitudinal axis of the laser to observe the generated spray in various cross-sectional views having different angular positions in relation to the spray while ensuring proper alignment between laser and detector. The spraying device can be rotated around the longitudinal axis of the laser and secured in at least a first position for observation of the axial cross-section section of the spray and in a second position for observation of the longitudinal cross-section of the spray. Alternatively, detector and laser may be connected so that they can be rotated around the longitudinal axis of the laser and secured in at least a first position for observation of the axial cross-section of the spray and in a second position for observation of the longitudinal cross-section of the spray.

DRAWINGS

The accompanying drawings, which are incorporated in and constitute a part of this specification, serve to explain the principles of the invention. The drawings are in simplified form and not to precise scale.

DETAILED DESCRIPTION

The method and apparatus of the present invention were developed in response to the specific problems encountered with various apparatuses for disintegration of small liquid amounts into fine droplets to produce coated medical implants. Examples of such medical implants include heart valves, pacemakers, tissues, sensors, catheters, needle injection catheters, blood clot filters, vascular grafts, stent grafts, biliary stents, colonic stents, bronchial/pulmonary stents, esophageal stents, ureteral stents, eye implants, aneurysm filling coils, and other coil devices.

Use of the medical implant model is not intended to limit the applicability of the method to that field. It is anticipated that the invention can be successfully utilized in other circumstances such as in the field of inhalation formulation, in-vitro diagnostics, and in other industrial spraying applications. Details in the Specification and Drawings are provided to understand the inventive principles and embodiments described herein, to the extent that would be needed by one skilled in the art to implement those principles and embodiments in particular applications that are covered by the scope of the claims.

The term “spray” as used herein defines a collection of particles or droplets of any liquid. The “spray performance” of a spraying device, such as an air atomizing nozzle, spray gun, plasma nozzle, electrostatic or ultrasonic nozzle, is characterized in terms of its emitted spray pattern, plume geometry, and droplet size. “Spray pattern”, also called “spray pattern data”, refer to a digitized image of a spray, which may be obtained by detecting the axial cross-section or longitudinal cross-section of a spray produced, among others, using electric, vibrating, or pneumatic means.

The “difference pattern”, also called “error pattern”, provides information on errors (deviations, asymmetries) in terms of location and quantity within a spray pattern.

Figure 1:
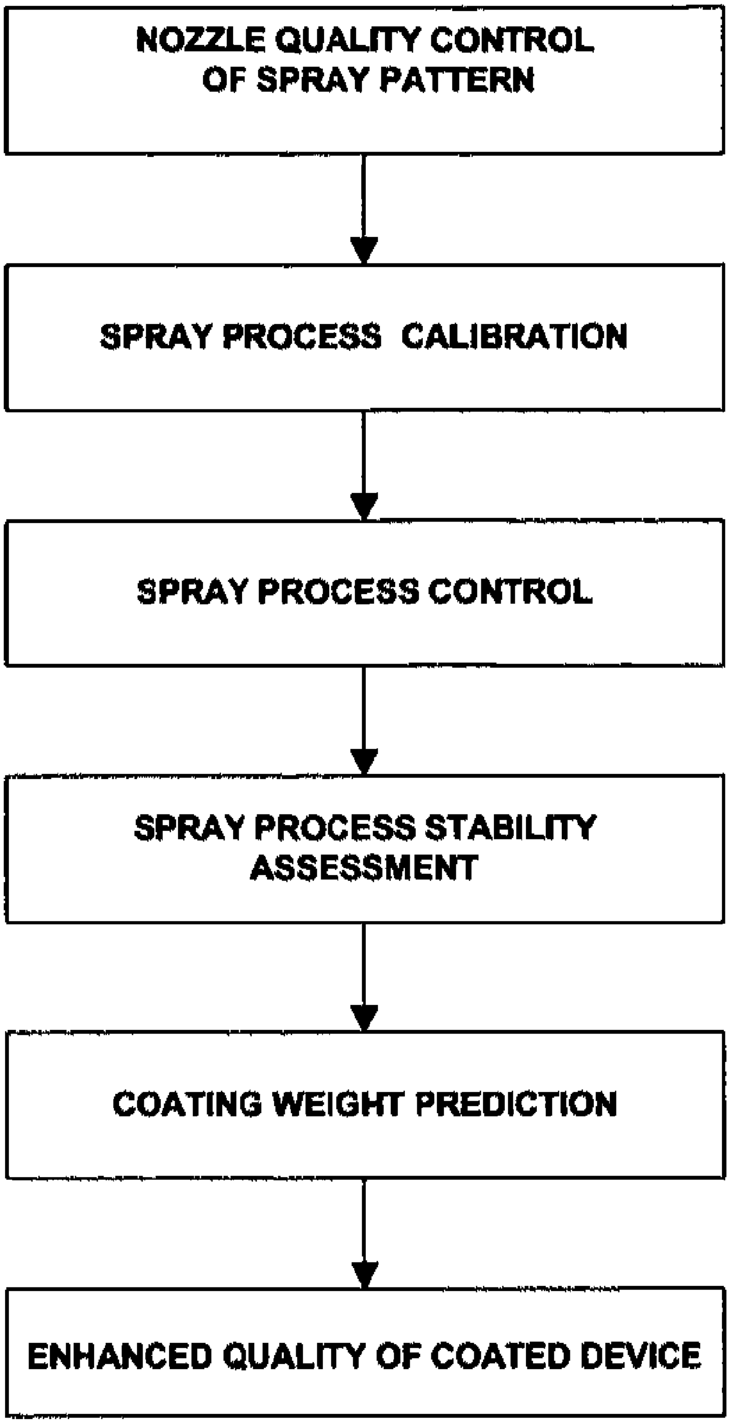
FIG. 1 depicts a flow chart showing an exemplary spraying process validation methodology.

Referring now to FIG. 1, an overview of the coating process control and validation methodology of the present invention is provided. It includes the steps of validating a spraying device for a particular application by characterizing the spray pattern and/or the spray plume, calibrating the spray process, controlling the spray process continuously, and validating the spray process by assessing process stability, coating quality and predicted coating weight.

Figure 2A:
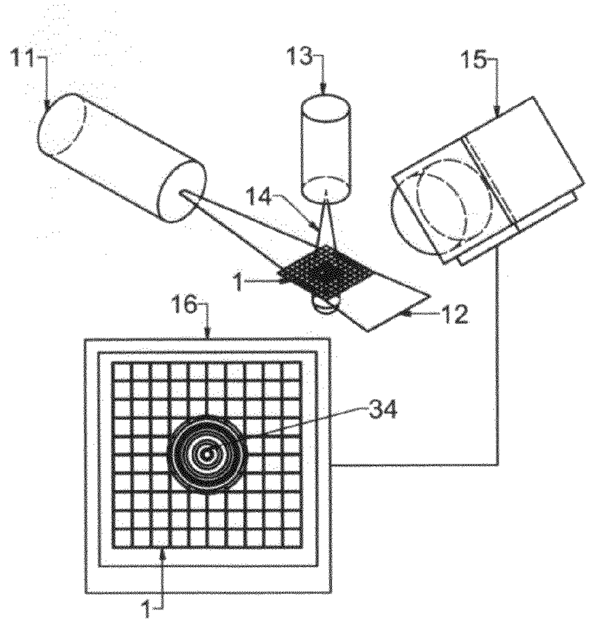
FIG. 2A is a perspective view of an apparatus for spray pattern characterization visualizing the pattern detection step.
Figure 2B:
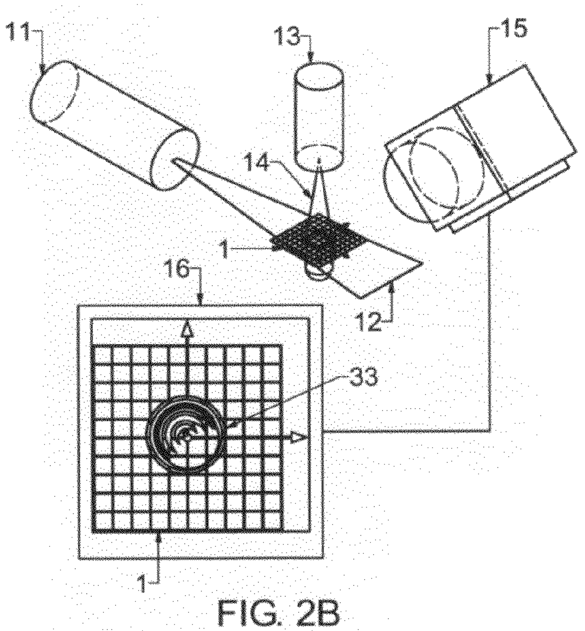
FIG. 2B is a perspective view of an apparatus for spray pattern characterization visualizing the pattern detection step for the device to be tested.

FIGS. 2A and 2B depict a schematic representation of the spray characterization and control apparatus of the present invention, which is designed to meet the needs of a variety of spray testing and spray control applications. An exemplary apparatus comprises a spray nozzle 13 for generating a spray 14, a light source (laser) 11 for producing a laser light sheet 12 and illuminating the spray, and a detector (camera) 15 for detecting a section of the spray. The area where the spray is detected is referred to herein as detection area 1. The detector 15 is connected to processing unit 16 for storing and evaluating the spray pattern data. The processing unit includes a Graphical User Interface (GUI) for displaying the relevant process parameters and the acquired spray pattern data in the detection area 1. The spray nozzle 13 may be located below the laser light sheet 12 or above the laser light sheet 12 produced by the laser 11 to detect the cross-section of the spray.

In operation, the laser light sheet 12 illuminates a cross section of the spray 14 at a predetermined distance from the orifice and the camera 15 simultaneously detects the light scattered from the illuminated droplets of the spray 14.

The intensity of parts of the acquired image is directly proportional to the local intensity of the laser light sheet and the local concentration of the droplet surface area. The intensity values within the resulting image describe the spatial droplet distribution or spray pattern.

In another embodiment information on the droplet size distribution, namely Sauter mean diameter (SMD) distributions, of the spray is obtained by using an additional detector for capturing a laser-induced fluorescence signal and calculating the ratio between the laser-induced fluorescence and the light scattering signals.

Figure 2C:
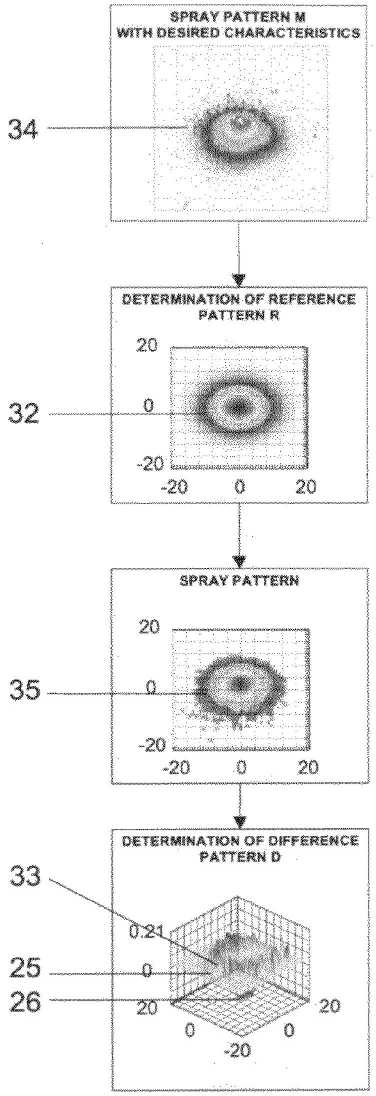
FIG. 2C depicts a flow chart showing an exemplary spraying device validation methodology.

To ensure reproducible and homogeneous coatings, it is important to first assess the quality of the spraying device. With reference to FIG. 2C a spraying device validation methodology is provided and illustrated by intensity plots showing the axial cross-section of a spray. It is to be understood that the procedure can also be applied to evaluate the longitudinal cross-section of a spray. The spraying device validation methodology comprises the steps of: determining a spray pattern with the desired properties as shown in FIG. 2A, processing the input pattern to obtain a reference pattern according to FIG. 5 A, B or C, detecting the spray pattern to be characterized, and comparing it with the reference pattern to obtain a difference pattern as shown in FIG. 2B.

Figure 3A:
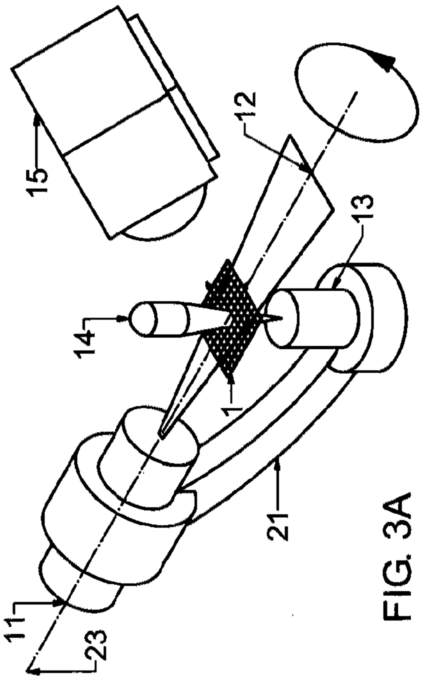
FIG. 3A is a perspective view of an apparatus for spray pattern characterization (axial cross-sectional view)
Figure 3B:
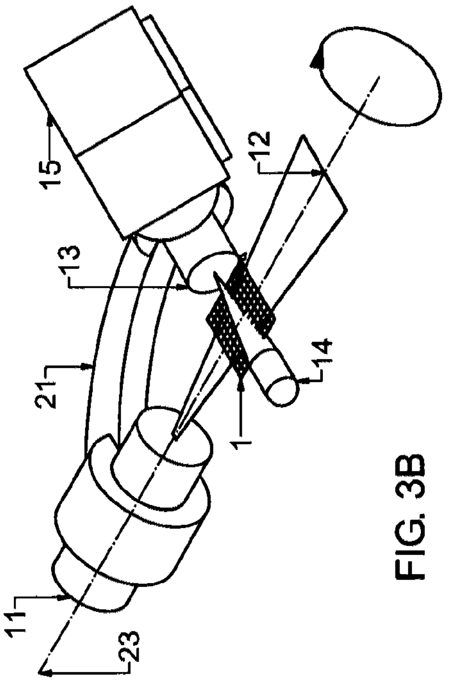
FIG. 3B is a perspective view of an apparatus for spray pattern characterization (longitudinal cross-sectional view)

FIGS. 3A and 3B illustrate an exemplary detection apparatus for validation of a spray pattern produced by a spraying device featuring versatile and repeatable spray characterization. A spraying device 1 is mounted on rig 21 and can be rotated around the longitudinal axis of the laser 11. Thus, different sections of the spray can be detected while detector and laser remain in a fixed position. A locking mechanism (not shown) is preferably provided to secure the spraying device in at least a first predetermined position to detect the spray pattern (axial cross-sectional view) and a second predetermined position to detect the spray plume (longitudinal cross-sectional view). The apparatus may also be equipped with motorized means (not shown) to automatically change the observation position during a spraying process.

In FIG. 3A the axis of the spraying device 13 is located perpendicular to the light sheet 12 to illuminate the axial cross-section of the spray. Referring to FIG. 3B, laser light sheet 12 and spray axis are located in one plane to detect the longitudinal cross-section of the spray or spray plume.

Figure 4A:
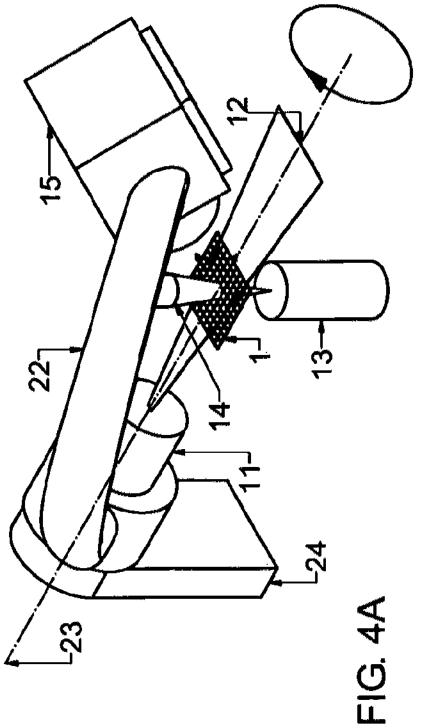
FIG. 4A is a perspective view of an alternative apparatus for spray pattern characterization (axial cross-sectional view)
Figure 4B:
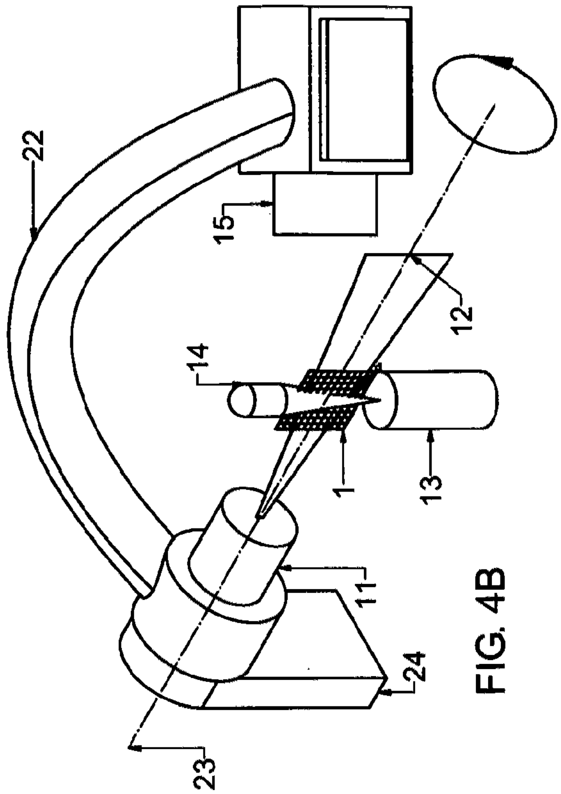
FIG. 4B is a perspective view of an alternative apparatus for spray pattern characterization (longitudinal cross-sectional view)

In the embodiment of FIGS. 4A and 4B laser 11 and camera 15 are connected to member 22 and can be precisely adjusted to measure the spray without changing the position of the spraying device. The detector-laser assembly is rotated around the longitudinal axis of the laser to detect the axial cross-section of the spray, as illustrated in FIG. 4A and the longitudinal cross-section of the spray shown in FIG. 4B. The assembly is supported by holding fixture 24. Since laser and camera are pre-adjusted in relation to each other, a re-adjustment is not necessary when changing the observation position form axial to longitudinal or vice versa resulting in enhanced measurement repeatability compared to prior art measurement setups. Due to the compact design and detector-laser alignment feature this embodiment is particularly suited for spray pattern and spray plume measurements during precision spraying processes. A re-adjustment of the spraying device position that may have a negative impact on the measurement is not necessary.

The spraying device validation methodology of FIG. 2C is described in more detail below. In a first step, the spray pattern of a spraying device having the desired spray characteristics (input pattern) is detected to obtain image data and transformed into a two-dimensional data array. An exemplary input pattern M is shown in FIG. 2A and in FIG. 2C by arrow 34. When determining the reference pattern the proper alignment of the input pattern in relation to the reference pattern must be ensured. A reference point, which may be coincident with the origin of the two-dimensional data array, is therefore preferably determined to align the input pattern in relation to the reference point of the reference pattern. The reference point may be determined as follows: When evaluating the axial cross-section of a spray the center of mass of the input pattern is calculated by evaluating the intensity values' weighted average for the array in both the x and y directions to obtain the reference point. When evaluating the spray plume, the intensity values' weighted average for the array is evaluated in either the x or y direction to compute a reference axis. The reference point is obtained by choosing an element of the array that is located along the reference axis in is located in a predetermined distance from the spray origin. Since background noise has a negative impact on the calculation of the position of the reference point, a threshold function substituting all values in the two dimensional array below the minimum threshold value with 0 is applied. In addition, a calibration image may be used to assign calibration parameters to the image and correct perspective distortions. Thus, spatial measurements are adjusted accordingly.
After determination of the reference point, the input pattern may be normalized and transformed so that the reference point is coincident with the origin of the array.

In a second step, the measured spray pattern is described through a reference pattern having a symmetrical distribution, which may be mathematically defined. The reference pattern is used to characterize and classify the spray pattern of the spraying device having the desired spray characteristics. A reference pattern $R_{(m,n)}$ having a high degree of conformity with the spray pattern of the reference spraying device may be obtained according to the procedure of FIG. 5A, 5B or 5C. An exemplary reference pattern 32 is visualized in FIG. 2C. The reference pattern is determined by performing a function fit using a function with two independent variables to obtain a match with the data of the spray pattern. A search for function f(x,y) is used to obtain a reference pattern having a symmetric distribution that best represents the spray pattern data or input pattern M. The resulting function f(x,y) describes the distribution of the input pattern and is evaluated for the same number of elements as the input pattern M. The evaluation of function f(x,y) returns the reference pattern R. The function f(x,y) may be obtained through coefficient fit by the following steps: finding a suitable fit function with at least two independent variables, adjusting at least one coefficient of the fit function, evaluating the function, determining the differences between the spray pattern with the desired spray characteristics and the calculated pattern, and choosing the coefficient that provides the best fit between the spray pattern and the calculated pattern.

Figure 5A:
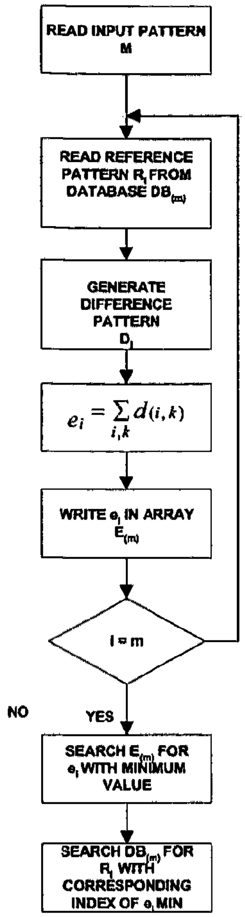
FIG. 5A shows an algorithm for determination of a reference pattern.
Figure 5B:
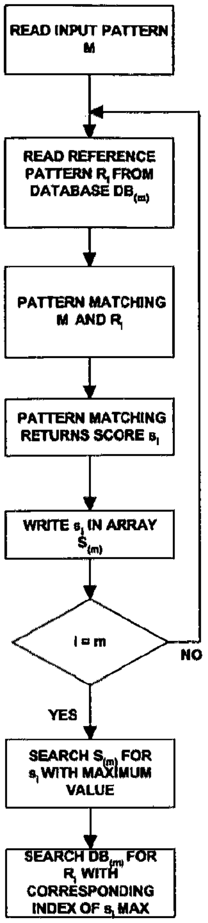
FIG. 5B shows an alternative algorithm for determination of a reference pattern.
Figure 5C:
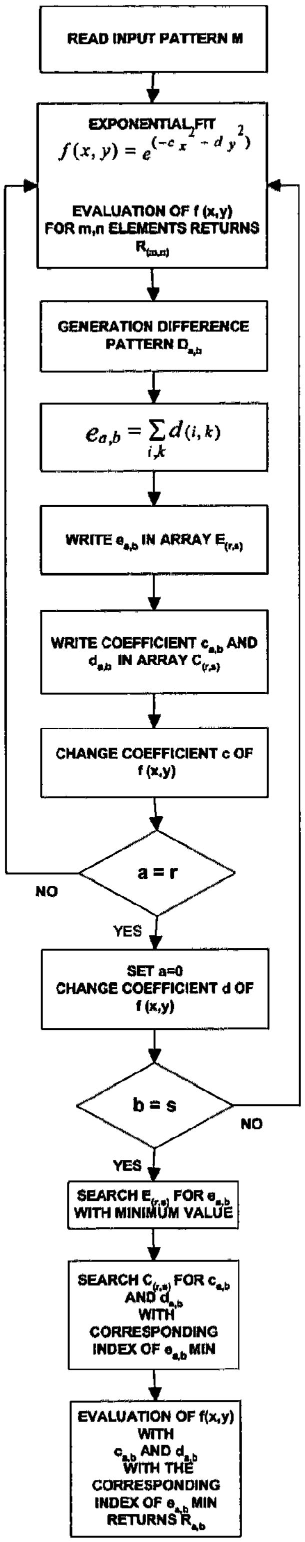
FIG. 5C shows an alternative algorithm for determination of a reference pattern.

With reference to FIG. 5C, a search algorithm returns a set of fit coefficients for a predetermined fit function. Function f(x,y) is calculated using an exponential coefficient fit. The input pattern M is read and an exponential fit is performed. A set of coefficients for the exponential function is returned. $R_{(m,n)}$ is obtained by evaluating f(x,y) for m,n elements. Then, a difference pattern $D_{a,b}$ is calculated from input pattern M and reference pattern $R_{a,b}$. The sum $e_{a,b}$ of the absolute values of all elements within $D_{a,b}$ is calculated and the value of $e_{a,b}$ is stored in the array $E_{(r,s)}$. The coefficients of the function $c_{a,b}$ and $d_{a,b}$ are stored in the array $C_{(r,s)}$. The coefficient c of f(x,y) is changed. If the number of iterations is not equal to r, the algorithm repeats the procedure. If the number of iterations a is equal to r, the index a is set to 0 and the coefficient d of f(x,y) is changed. If the number of iterations b is not equal to s, the algorithm repeats the procedure. If the number of iterations b is equal to s, the algorithm searches for $e_{a,b}$ with the smallest value within the array $E_{(r,s)}$. Then, the algorithm searches within $C_{(r,s)}$ for the coefficients $c_{a,b}$ and $d_{a,b}$ with the index a,b having the same index as $e_{a,b}$ with the smallest value within $E_{(r,s)}$. The function f(x,y) for m,n elements with the coefficients $c_{a,b}$ and $d_{a,b}$ having the corresponding index of $e_{a,b}$ with the smallest value is evaluated and reference pattern $R_{(m,n)}$ is returned.

If several input patterns are available, for instance stored in a database, the reference pattern may be determined as represented in FIG. 5A and FIG. 5B. The following steps may be performed: comparing a spray pattern having the desired spray characteristics with a reference pattern, calculating a degree of conformity between both patterns, and determining the reference pattern having the highest degree of conformity with the spray pattern. Referring to FIG. 5A, an input pattern M is read in and a reference pattern $R_i$ is read from database $DB_{(m)}$. A difference pattern $D_i$ with the same index as the reference pattern $R_i$ is calculated. The sum $e_i$ of the absolute values of all elements within $D_i$ is obtained and the value of ei is stored in the array $E_{(m)}$. A difference pattern $D_i$ is calculated for each reference pattern $R_i$ stored in database $DB_{(m)}$. Sum $e_i$ is obtained and stored. After calculating $D_i$ and $e_i$ for each reference pattern $R_i$, the minimum value of $e_i$ within $E_{(m)}$ is searched. The reference pattern $R_i$ with the corresponding smallest $e_i$ value and the highest degree of conformity with the input pattern M is chosen.

Furthermore, a pattern-matching procedure may be adopted. According to FIG. 5B, an input pattern M and a reference pattern are read from database $DB_{(m)}$. A pattern-matching algorithm evaluates the degree of conformity between input pattern M and reference pattern $R_i$. A score value $s_i$ is calculated for each reference patterns $R_i$ in database $DB_{(m)}$ and stored in array $S_{(m)}$. The maximum score value of $s_i$ within $S_{(m)}$ is searched within the available reference patterns $R_i$. The reference pattern having the maximum score value $s_i$ and the highest degree of conformity with the input pattern M is used to compute the difference pattern. In a third step, the spray pattern of the spraying device to be tested 35 is detected as visualized in FIG. 2C.

In another step, the spray quality of the spraying device to be evaluated is assessed in terms of spray pattern symmetry by determining the deviations between the reference pattern R 32 and the spray pattern of the spraying device to be tested 35 and evaluating at least one parameter for variations between both patterns. A difference pattern D 33, which provides information on deviations, also called asymmetries, between the spray pattern and the reference pattern, is depicted in the schematic representation of FIG. 2B by arrow 33. A 3-D plot of an exemplary difference pattern 33 is visualized in FIG. 2C. With reference to FIG. 2C, positive "Z" values show deviations resulting from high distribution densities of particles 25 and negative "Z" values deviations resulting from low distribution densities 26.

Figure 6:
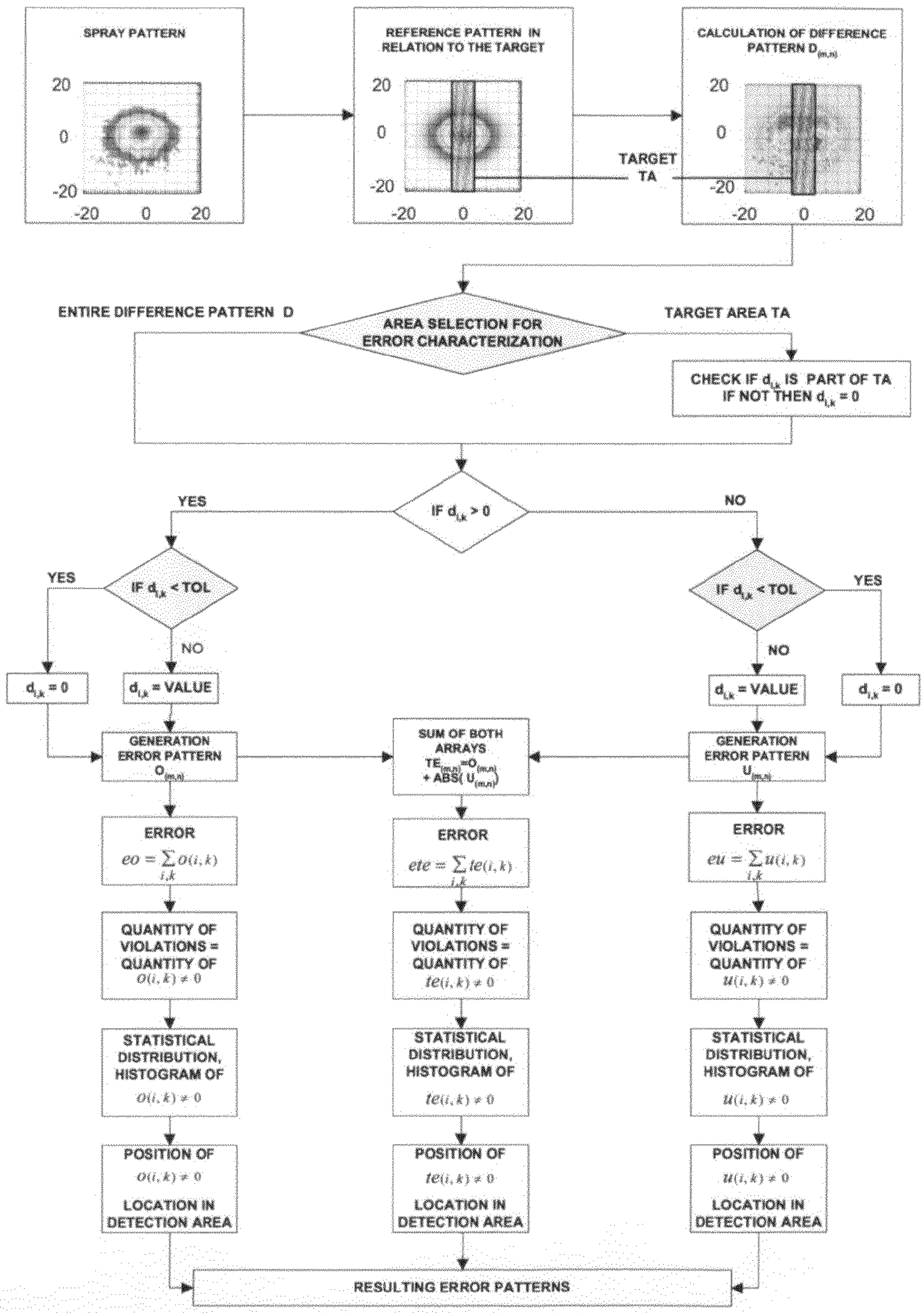
FIG. 6 is a flow chart visualizing a spray error detection and evaluation algorithm.

An error evaluation algorithm for identifying and evaluating the asymmetries, also referred to as errors, within the spray pattern (visualized by difference pattern D) is represented in FIG. 6. The entire difference pattern D or a specific region within the difference pattern D may be evaluated to validate a spraying device for a particular application or to calibrate a spraying process. After selecting the region to be evaluated (entire difference pattern D or specified area TA), positive and negative elements $d_{i,k}$ are separated within the selected area and a tolerance check is performed. If the value of $d_{i,k}$ is in tolerance, the value of $d_{i,k}$ is substituted by 0 and if the value of $d_{i,k}$ is not in tolerance, the value of $d_{i,k}$ is maintained. After checking the tolerance range for each element $d_{i,k}$ of the difference pattern D, the algorithm generates two error patterns having the same number of elements as the difference pattern D. An error pattern for high droplet distribution densities $O_{(m,n)}$ and an error pattern for low droplet distribution densities $U_{(m,n)}$ is returned. The error pattern $TE_{(m,n)}$, which can be calculated by adding $O_{(m,n)}$ and the absolute value of $U_{(m,n)}$, visualizes errors generated by high and low distribution densities of particles or droplets. In the next step, error sum and error number are calculated from $O_{(m,n)}$, $U_{(m,n)}$, and $TE_{(m,n)}$ and the error size distribution is computed.

The algorithm returns, among others, spray error type, size, size distribution, sum, error number, error position, and maximum error. The resulting error pattern can be further specified using an error-pattern recognition procedure. The mathematical description of the spray pattern with the related analysis methods and indices provides a detailed characterization and classification of the spray produced by a particular spraying device. Thus, objective quality criteria for detailed atomizer characterization and validation are provided.

In precision coating processes objective data on the spray performance and in particular on the spray consistency in relation to the substrate are the presumption for high-quality coatings and in particular for a homogeneous coating thickness. This requires a process calibration step prior to starting the actual spraying process in order to ensure the correct and repeatable alignment of the spray as well as the spray performance in relation to the spray target.

Figure 7A:
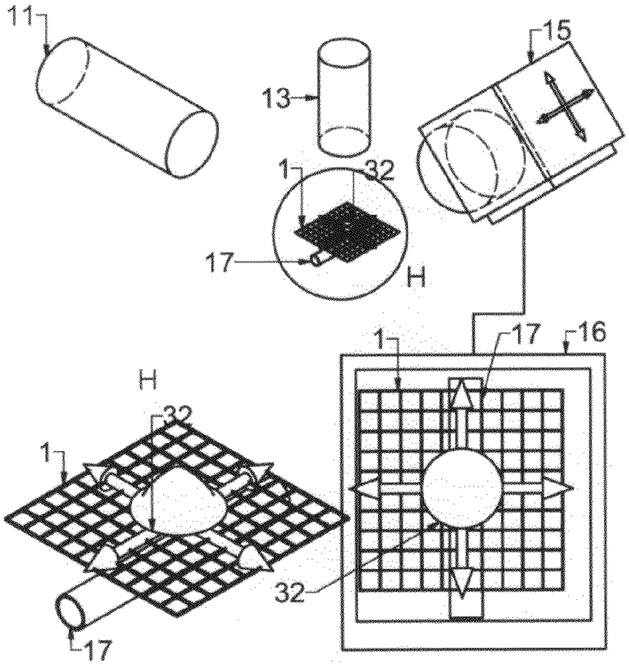
FIG. 7A depicts one step of the calibration procedure prior spraying.
Figure 7B:
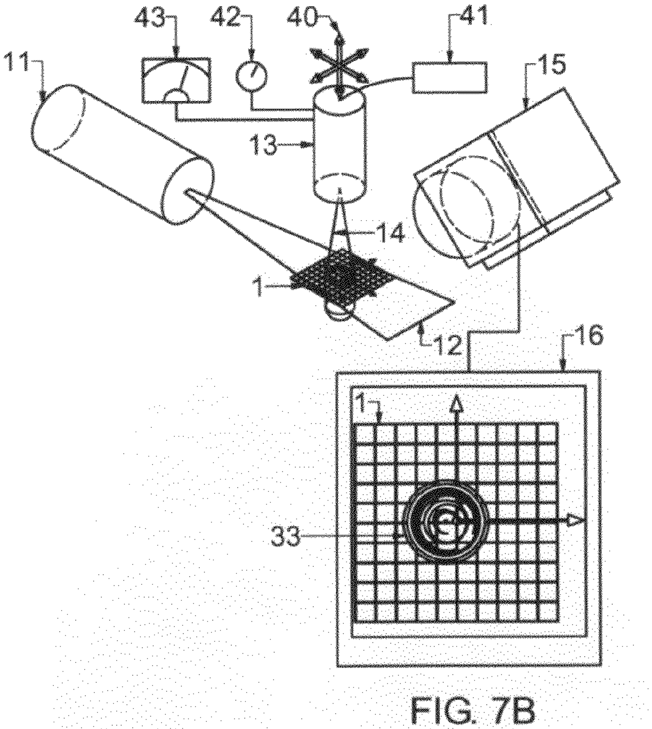
FIG. 7B depicts another step of the calibration procedure.
Figure 8:
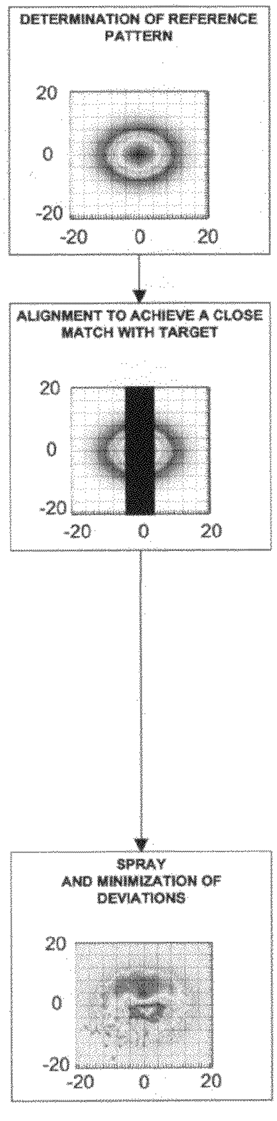
FIG. 8 illustrates a flow chart showing an exemplary spray pattern calibration methodology.

FIG. 7A, 7B and FIG. 8 indicate an exemplary coating process setup and method of calibration based on the spray characterization methodology described before. A reference pattern is used as calibrating means for the spray to be evaluated in order to align the position of the substrate in relation to the spray source. In a first step, as shown in FIG. 8, a suitable reference pattern is determined. In a second step, the position of the substrate 17 is defined within the detection area 1. To determine the position, the substrate 17 and/or the detection area 1 are preferably aligned in close proximity to each other by moving the substrate and/or the camera. Alternatively, a calibration device (not shown) can be located in close vicinity to the substrate 17 so that the substrate position is at least partially projected into the detection area 1. The position of the reference pattern 32 within detection area 1 may also be adjusted in relation to substrate 17 or calibration device to achieve a close match with the substrate. A plot showing the substrate in relation to the reference pattern is provided in FIG. 8. In a third step depicted in FIG. 7B, the spraying device 13 produces a spray 14. Image data are acquired and a difference pattern 33 is calculated for each captured spray pattern by comparing the current spray pattern with the reference pattern. The difference pattern 33 is visualized in detection area 1.

In order to minimize deviations between the reference pattern and the current spray pattern, the position 40 of the spraying device may be adjusted. If after the spraying device alignment spray errors are still visible, the nozzle operating parameters should be fine-tuned to minimize deviations between the reference pattern and the current spray pattern. Depending on the particular spaying process and technology employed, liquid supply 41, atomizing pressure 42, and applied voltage or electrical power 43 may be controlled. Other operating parameters, which can be adjusted, include oscillation frequency, the ratio of central gas stream and fan gas stream, and the like. A plot showing the resulting difference pattern is provided in FIG. 8.

It is advised to calibrate the coating process on a regular basis and to continuously monitor relevant coating process parameters prior and during operation so that a consistent spray performance is ensured.

Figure 9A:
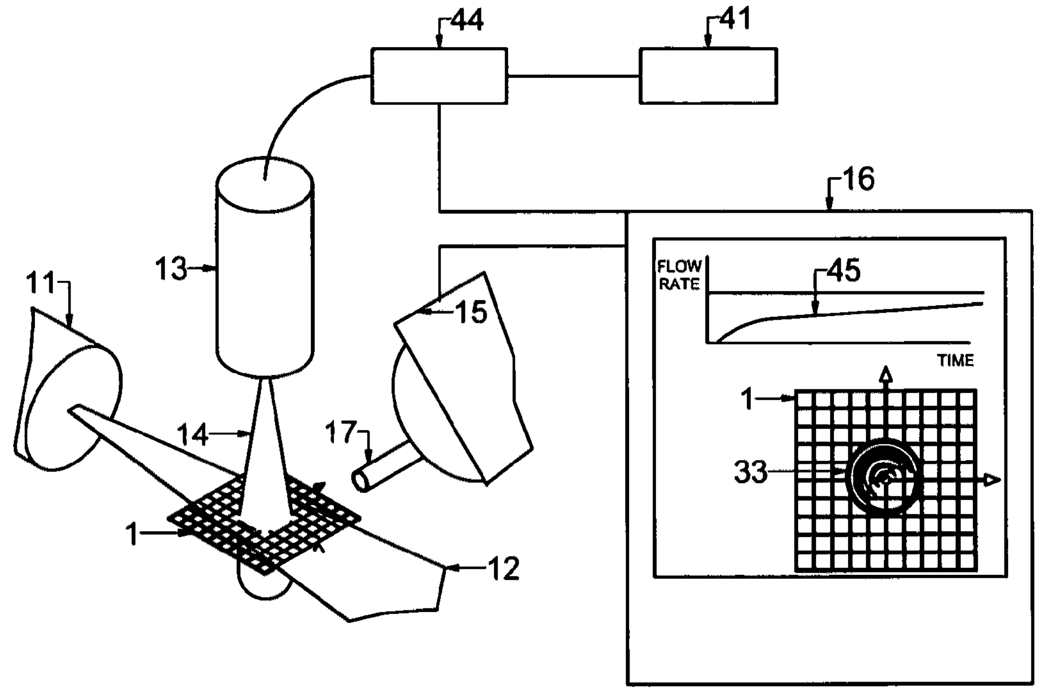
FIG. 9A illustrates a spray coating setup prior to coating application.
Figure 9B:
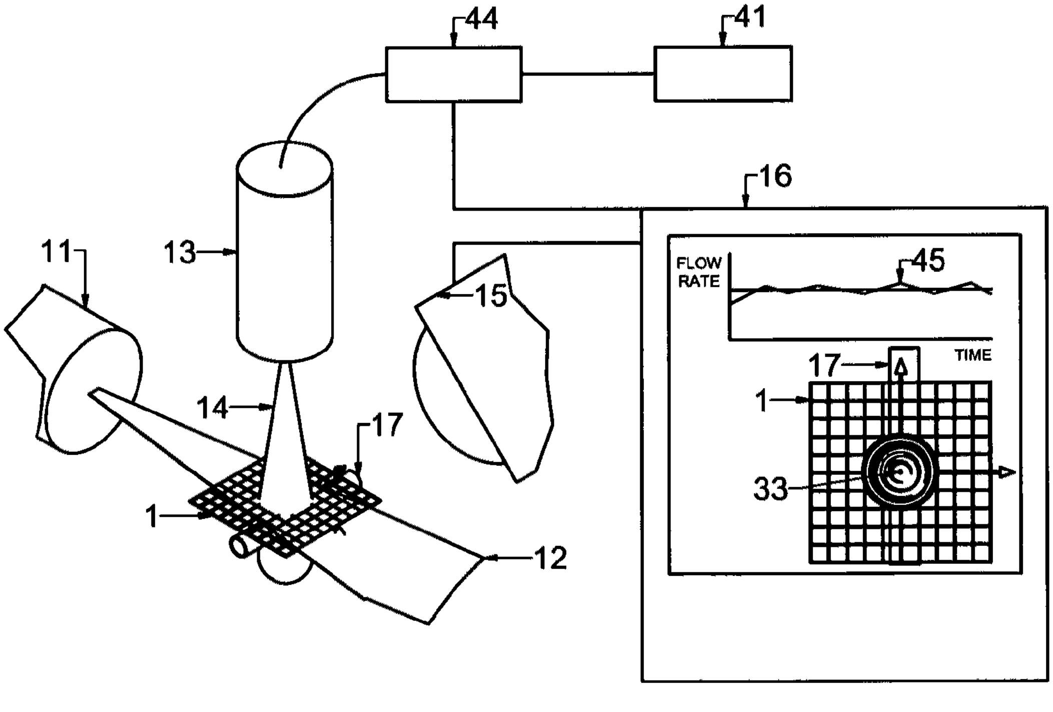
FIG. 9B depicts a spray coating setup during coating application.

The timing of substrate exposure, as depicted in FIG. 9A, is an important factor that may have a considerable impact on the coating quality. Thus, the substrate should be exposed to the spray when the spatial droplet distribution and/or the current spray position are in tolerance. The current spray pattern position may be obtained by calculating the distance between the center of mass of the spray pattern and the spray target. In addition, relevant process parameters, such as the liquid flow rate, may serve as criteria to fine-tune the exposure of the substrate to the spray source. FIG. 9A and FIG. 9B depict an exemplary coating process control setup in which the actual flow rate and the spatial droplet distribution are used to fine-tune substrate exposure. In operation, liquid is supplied at a predefined flow rate from fluid supply 41 via flow meter 44 to spraying device 13 and a spray plume 14 is produced. The laser 11 emitted light sheet 12 illuminates a portion of the spray 14 and the camera 15 detects the scattered light of the droplets. The current liquid flow rate that is visualized by graph 45 and the difference pattern 33 are monitored and displayed on the GUI of the processing unit. It can be seen, that after starting the spraying process, the flow rate and the spray take some time to stabilize. Since the flow rate 45 and the difference pattern 33 are not in tolerance, the substrate 17 is positioned outside the spray area to prevent inhomogeneous coatings resulting from spray performance variations. When the flow rate 45 and the spatial droplet distribution (difference pattern 33) are in tolerance, the substrate is exposed to the spray as depicted in FIG. 9B.

During the coating process spray characteristics, spray position and specific nozzle operating parameters should be continuously monitored to detect and correct spray errors. By obtaining quantitative information on specific spray errors affecting the spray and/or the coating quality rather than relying on specific operating parameters, the spray process is immediately and efficiently controlled.

An exemplary error evaluation algorithm for identifying and evaluating relevant asymmetries, also referred to as errors that are visualized by the difference pattern, in relation to a specific substrate is represented in FIG. 6.

Spray errors in relation to a substrate are evaluated within the area TA representing the substrate to be coated. The algorithm checks if the value of an element of the difference pattern $d_{i,k}$ is within TA. Values of an element of the difference pattern $d_{i,k}$ outside TA are not processed. Values not equal to 0 indicate a deviation from the reference pattern and may result in a spray error. The algorithm returns, among others, spray error type, size, size distribution, sum, error number, error position, and maximum error.

Thus, spray errors resulting from changing process conditions, nozzle build-up or deviations of the spray position in relation to the spray target are readily identified. A corrective action, such as realignment or cleaning, is preferably performed if a specific spray error occurs to prevent coating defects.

In another embodiment, a spray data evaluation procedure is provided for predicting the resulting coating quality of a substrate in terms of coating thickness and coating thickness deviations. The scattered light signal of the spray, which has been detected during the coating process, is used to assess the process stability and the amount of coating deposited on the substrate. The coating quality evaluation procedure comprises the following steps. A spray pattern is detected during the coating run and the spray intensity values are quantified for each detected spray pattern array by calculating the sum of all elements m(ik) in the detected spray pattern array. The spray pattern intensity values are preferably quantified in relation to the substrate by calculating the sum of all elements m(ik) contained in area TA. After coating the substrate, the spray intensity values of all spray pattern arrays detected during the coating run are summarized.

To ensure the accuracy of the data a calibrating step may be performed and a relation between the totalized spray pattern intensity measured during material deposition and the weight of the deposited material is determined. The coating weight may be measured using a micro balance or a similar measurement instrument to determine a calibration factor.

The following example is being provided by way of illustration and is not intended to limit the embodiments of the present invention.

Stent Coating Example

Multiple stents having a diameter of 2 mm and a length of 20 mm are inspected using a microscope and weighted with a microbalance before applying a coating composition comprising a polymer and a therapeutic agent. The stents are mounted on a holding device as described in U.S. Pat. App. No. 60/776,522 incorporated herein as a reference.

A pneumatic spraying device is validated according to the procedure of FIG. 2C to ensure that the spray performance is in tolerance (spraying device validation step). The orifice of the spraying device is preferably positioned at a distance of approximately 12 to 35 mm from the outer surface of the stent. The spraying device is connected to a syringe pump (Hamilton Inc., Reno, Nev.) to feed the coating composition and to a compressor to supply the compressed gas used to disintegrate the spray in fine droplets. The detection area is illuminated using a Diode Pumped Solid State (DPSS) Laser (Chrystallaser, NV) with a wavelength of 532 nm. For best results, the laser should be equipped with a light sheet optic with adjustable focus length. The laser is aligned so that the laser light sheet is focused on the detection area downstream from the nozzle. A progressive scan camera with a CCD chip having a resolution of 680×480 pixels is used to detect the spray pattern.

A tolerance range (upper and lower limit) is setup for various operating parameters, spray pattern characteristics and spray process stability to allow feedback control of the coating process.

Coating Process Calibration

The position of the spraying device is aligned in relation to the stent, as described in FIG. 7A and FIG. 7B, using the reference pattern that has been determined during the spraying device validation step. After aligning stent and reference pattern, the stent is moved outside the spray region and the spray process is started to ensure that the spray performance is in tolerance.

The droplets cross the light sheet and a scattered light is produced, which is captured by the camera. The light is then transformed into an electrical signal, which is transferred to a PC equipped with a frame grabber card, such as NI1409 (National Instruments, TX). The electrical signals (spray data) are evaluated according to the procedure of FIG. 6 and relevant operating parameters and spray errors are displayed. The position of the nozzle and the gas flow rate is adjusted to minimize the detected errors until the spray performance is in tolerance.

Coating Process Monitoring & Control

After performing the calibration step, the spraying process is started again. The operating parameters of the spraying device and the difference pattern are displayed to ensure that the spray process is in specifications. Once the liquid flow rate and the spray pattern are in tolerance, the stent is exposed to the spray. Rotary motion is transmitted to the stent to rotate the stent about its central longitudinal axis. The rotation speed can be from about 5 rpm to about 250 rpm. By way of example, the stent may rotate at 130 rpm. The stent is translated along its central longitudinal axis along the atomizer. The translation speed of the stent can be from about 0.2 mm/s to 8 mm/s. The stent can be moved along the atomizer one time to apply the coating in one pass or several times to apply the coating in several passes.

Figure 10:
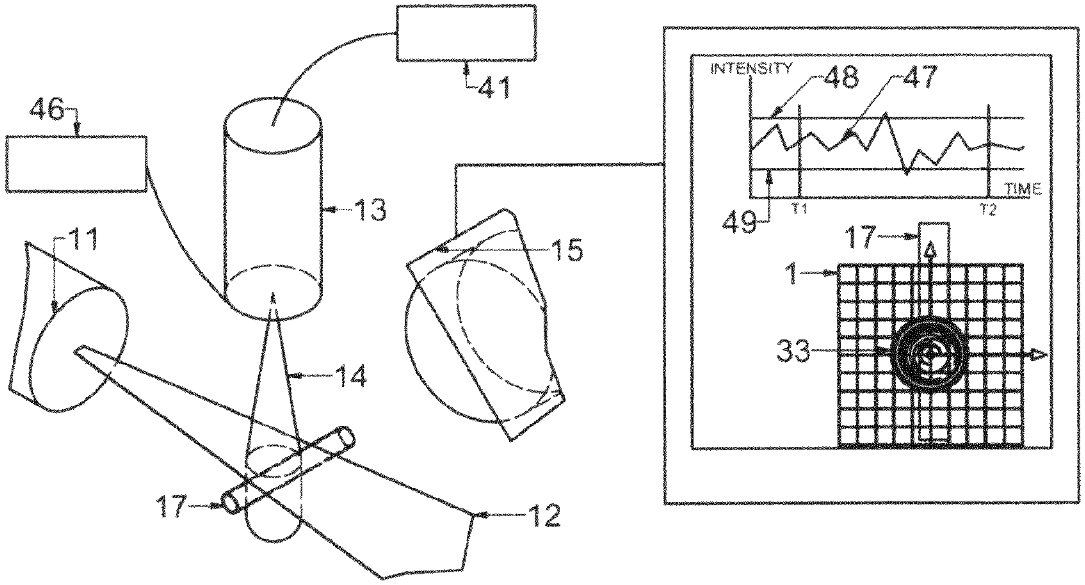
FIG. 10 is a perspective view of a system setup and procedure for measuring the spraying process stability.
Figure 11:
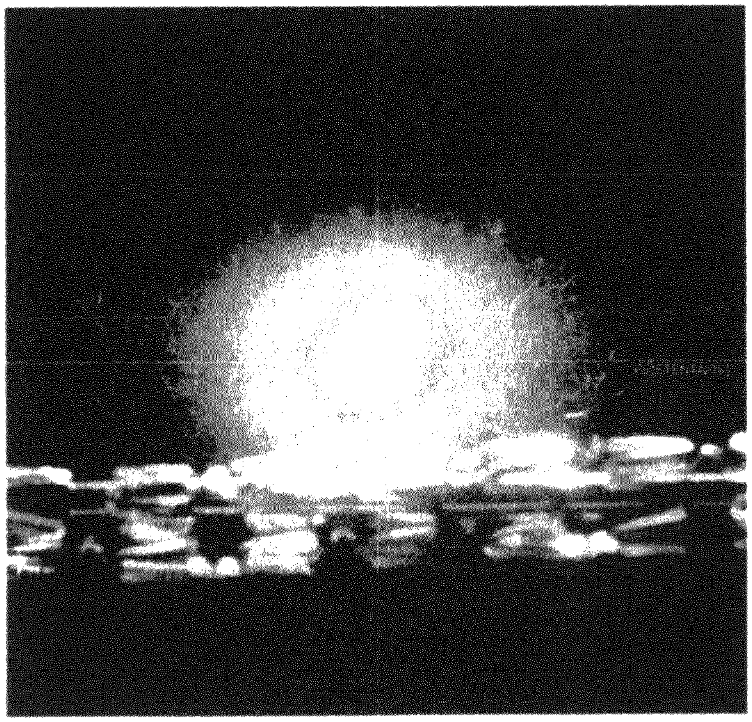
FIG. 11 is a software screen dump visualizing monitoring and control of a coating process.

With reference to FIG. 10 and FIG. 11, the current spray position, the spray errors in relation to the stent and the spray consistency are continuously monitored during application of the coating to prevent deterioration of the coating quality.

The current spray errors are evaluated according to FIG. 6 for stent area TA. When the detected errors exceed the predefined tolerance range, a user acknowledgement is displayed and information on error type, size, position, number, distribution, and current deviation between stent location and spray pattern is provided. If the error criteria are not in tolerance and depending on error constellation, the spraying device is aligned in relation to the stent and/or the nozzle of the spraying device is wetted after the application of the coating. Furthermore, various operating parameters of the spraying device, such as the atomizing pressure, may be adjusted to correct the shape and the spatial particle distribution of the spray.

With reference to FIG. 10, the current spray pattern intensity signals 47 are visualized in a graph over time and the difference pattern 33 is displayed in relation to the stent 17 to be coated. The spray intensity values of the detected spray pattern are evaluated to assess the spray performance in terms of stability. If the spraying device pulsates and the detected intensity values 47 exceed the upper 48 and/or lower limit 49, an alert is triggered and a corrective action may be performed. For example, in case of spray stability deterioration due to nozzle build-up a cleaning cycle is performed and a cleaning fluid is supplied from unit 46 to remove material build-up.

Besides effective feedback control of the coating process, objective information on the coating process stability and the resulting coating quality is provided by processing the measured intensity values accordingly.

After application of the coating, the coated stents were inspected and weighted to determine the coating weight. The coefficient of variation of the coating weight was 1.4%, which outlines the benefits of the spray coating calibration and process control method and apparatus of the present invention.

It has been demonstrated, that using the methodology and the apparatus the present invention a stable coating process is obtained resulting in homogeneous high-accuracy coatings with a reproducible coating weight. The stent-coating example outlines the impact of the spray characteristics of the spraying device on the coating quality and reproducibility.

The invention claimed is:

1. A method to measure a spray pattern using a detection apparatus including at least a light source, a processing unit, and a detector comprising the following steps:

(a) determining a pattern having a symmetrical distribution representing the desired spray distribution that is used as reference pattern;

(b) obtaining a spray pattern;

(c) comparing the spray pattern with the reference pattern to detect deviations between the spray pattern and the reference pattern; and (d) evaluating the deviations in terms of size and/or location.

2. The method of claim 1 wherein the reference pattern is determined by performing a function fit.

3. The method of claim 2 wherein the function fit is performed by the following steps:

determining a suitable fit function with at least two independent variables;

adjusting at least one coefficient of the fit function;

evaluating the fit function;

determining the differences between the spray pattern with the desired spray characteristics and the calculated pattern; and choosing the coefficient that provides the best fit between the spray pattern with the desired spray characteristics and the calculated pattern.

4. The method of claim 1 wherein the steps (b), (c) and (d) are performed continuously during a spraying process to assess the current process performance.

5. The method of claim 1 wherein the steps (b), (c) and (d) are repeated for a series of spraying devices to assess the spray quality within a batch.

6. The method of claim 1 further comprising the step of defining a tolerance range for at least one parameter to be evaluated.

7. The method of claim 1 further comprising the step of monitoring the scattered light intensity signal of the spray over time to measure the consistency of the spraying process.

8. The method of claim 7 further comprising the step of calculating the coefficient of variation of the scattered light intensity signal values for a time interval.

9. The method of claim 1 further comprising the step of acquiring a first image representing a Mie scattering signal and a second image representing a laser-induced fluorescence signal and both images are processed to obtain information on the droplet sizes produced by the spraying device.

10. The method of claim 1 wherein at least one step is performed during a coating process.

11. Method of claim 10 further comprising the following steps:

defining a tolerance range for the deviations; and exposing a substrate to the spray stream when the deviations are in tolerance.

12. The method of claim 10 further comprising the step of monitoring the liquid flow rate of the fluid to be disintegrated including the following steps:

defining a tolerance range for the flow rate;

measuring the flow rate; and exposing the substrate to the spray when the flow rate is in tolerance.

13. The method of claim 10 further comprising the following steps:

(a) obtaining the position of the substrate within the detection area;

(b) transforming the reference pattern and/or the substrate in close proximity to each other;

(c) acquiring the spray pattern;

(d) comparing the spray pattern with the reference pattern to detect deviations between both patterns; and (e) determining the size and/or the location of the deviations in relation to the substrate.

14. The method of claim 13 wherein the position of the substrate is determined by projecting the substrate position into the detection area.

15. The method of claim 13 wherein the position of the substrate is determined by locating the detection area and/or the spray target in close proximity to each other.

16. The method of claim 13 wherein steps (c), (d) and (e) are repeated to control the coating process.

17. The method according claim 1 further comprising the step of adjusting at least one parameter of the spraying device to minimize the deviations between the acquired spray pattern and the reference pattern.

18. The method of claim 17 wherein the parameter to be adjusted is the position of the spraying device and/or an operating setting of the spraying device.

19. Method to predict the amount of material deposited on a substrate during a coating process using a spray pattern detection apparatus including at least a light source, a processing unit, and a detector having a detection area to capture a spray, comprising the following steps:

(a) obtaining the position of the substrate within the detection area of the detector;

(b) detecting a spray pattern;

(c) quantifying the spray pattern intensity for the part covering the substrate; and (d) totalizing the spray pattern intensity values during the time the substrate is exposed to the spray to obtain the coating weight of the coated substrate.

20. The method of claim 19 further comprising a calibration step including the steps of:

measuring the weight of the deposited material on the substrate; and determining a relation between the totalized spray pattern intensity values obtained during material deposition and the weight of deposited material.

21. The method of claim 19 wherein the substrate is a medical device.

22. Method to enhance coverage of a substrate with a fluid to be disintegrated by a spraying device using a spray pattern detection apparatus including at least a light source, a processing unit, and a detector to capture a spray comprising the following steps:

(a) obtaining the position of the substrate within the detection area;

(b) acquiring a spray pattern;

(c) calculating the center of gravity of the spray pattern;

(d) determining the distance between the center of gravity of the spray pattern and the position of the substrate; and (e) adjusting at least one parameter to minimize the distance between the center of gravity of the spray pattern and substrate position.

23. Apparatus for characterizing a spray generated by a spraying device comprising at least a laser for producing a light sheet, a detector and a spraying device wherein at least a part of the apparatus can be rotated around the longitudinal axis of the laser to observe the generated spray in various cross-sectional views having different angular positions in relation to the spray while ensuring proper alignment between laser and detector.

24. The apparatus of claim 23 wherein the spraying device can be rotated around the longitudinal axis of the laser and secured in at least a first position for observation of the axial cross-section and in a second position for observation of the longitudinal cross-section view of the spray.

25. The apparatus of claim 23 wherein the detector is connected to the laser and the detector and the laser can be rotated around the longitudinal axis of the laser and secured in at least a first position for observation of the axial cross-section and in a second position for observation of the longitudinal cross-section of the spray.

26. The method of claim 1 further comprising the step of detecting the deviations between the spray pattern and the reference pattern over time to measure the consistency of the spraying process.

* * * * *